3,544,499
SULFONIUM MODIFIED WATER SOLUBLE SURFACE COATINGS

Melvin J. Hatch, Socorro, N. Mex. assignor to The Dow Chemical Company, Midland, Mich., a corporation of Delaware
No Drawing. Continuation-in-part of application Ser. No. 112,513, May 25, 1961. This application Oct. 14, 1966, Ser. No. 586,670
Int. Cl. C08f 15/00, 27/06
U.S. Cl. 260—29.6   28 Claims

ABSTRACT OF THE DISCLOSURE

Water-soluble, heat-polymerizable salts containing sulfonium ions as the cationic moiety thereof are employed as binders in coating compositions which provide an initial hydrophilic coating convertible to a hard, water-insoluble coating by heating.

CROSS-REFERENCE TO RELATED APPLICATION

This is a continuation-in-part of my copending application, Ser. No. 112,513, filed May 25, 1961 and now abandoned.

The present invention relates to heat-curable, water-soluble, film-forming compositions and to surface coatings prepared therefrom and is more particularly concerned with sulfonium-containing, watersoluble organic surface coatings which are heat convertible to water-insoluble organic coatings. By surface coating is meant a coating on the outermost exterior surfaces of an object.

In order to be useful, most surface coatings need to be applied in a fluidized state and then must dry or cure to solid, continuous films which are water resistant and at the same time have good adhesion to the surface which is coated. Surface coating compositions usually comprise a vehicle and miscellaneous ingredients such as pigments, extender pigments, fungicides and the like. The vehicle is a fluid consisting of a solution or mixture of a binder with a thinner or solvent. The binder is the primary constituent since it binds the pigment particles together and fixes the surface coating film to the substrate or surface of the object being coated. (Bobalek, "Principles of Paint Formulation" in Organic Protective Coatings, ed. Fischer et al., Reinhold, New York, N.Y. (1953); Martens, Emulsion and Water Soluble Paints and Coatings, Reinhold, New York, N.Y. (1964).) To enable the coatings to dry or cure to form solid, continuous, adhesive films, binders which are polymeric, or which polymerize oxidatively or thermally after application to the surface, have generally been employed. To enable the coatings to achieve water resistance, binders which are hydrophobic, and therefore not soluble in water, have generally been used. Thus, the thinner, or solvent, used as needed to fluidize the surface coating, has usually been an organic solvent such as xylene, toluene, various alcohols and the like. Not only are such solvents more expensive than water, they also have the added disadvantage of being highly flammable, thus requiring extra care in their manufacture, storage and use.

As water is an ideally cheap, non-toxic, non-flammable solvent or thinner, it is advantageous, and it is a desideratum in the art, to provide film-forming compositions which can be thinned by water, and yet will produce water resistant films on drying or curing, after application to the surface.

Consequently, emulsion or latex based surface coatings, wherein the hydrophobic binder is only colloidally dispersed or fluidized by use of an anqueous dispersing medium, have found wide commercial utility. These types of surface coating suffer from various shortcomings, however; the flow-properties often are not as satisfactory as those wherein the binder is thinned by actually being dissolved in the solvent or thinner; and also undesirable coagulation of the latex or emulsion-based surface coatings often occurs. Previous, well-known water soluble surface coating binders such as glue or casein, however, usually have suffered from unde water sensitivity of the surface films formed on drying. Thus, they are not suitable for many uses where exposure of the surface films to moisture may occur. Ammonia solubilized polymers containing carboxyl group also are known in the art, wherein heat treatment of the applied film leads to a degree of water resistance, due to disassociation of the ammonium salt or to amide formation, etc., therefrom.

I now have found that by the use of sulfonium monomers or polymers or sulfonium salts of anionic monomers or polymers, with or without additives, as binders in surface coating formulations, water-soluble surface coatings can be obtained, which on heat treatment, become hydrophobic, presumably due to the conversion of the highly polar ionic sulfonium groups to non-ionic materials.

I explain this unique behavior as follows, although this explanation is only theoretical, and has not been proven, nor is the invention dependent on this particular mode of explanation.

It is known that sulfonium groups are positively charged and hydrophilic and will react with negatively charged hydrophilic ionic species such as chloride ions, bromide ions, ionic carboxylate organic groups, cyanide ions, sulfate ions, sulfonate ions, phosphate and phosphonate ions, carbonate ions, sulfide ions, mercaptide ions, thiocarbonate ions, and thicarbamate ions.

It is well known in surface coating technology, that a fairly high molecular weight (several thousand or more) of at least some of the components of the binder of a dried or cured surface coating is necessary in order for the surface coating to have practical and useful properties. The molecular weights must be sufficiently high so that the cured coating binder is solid, amorphous and cohesive, and so that it forms a relatively tough or hard coating. Generally, it is best especially for water or solvent resistance if the molecular weights after curing are high with many crosslinks present, so that a polymeric network is produced.

Experimental tests have shown that these limitations also apply to surface coatings which contain sulfonium compounds. Thus, low molecular weight (less than several thousand) sulfonium compounds which do not polymerize further on heat treatment are not useful in practicing the invention. Since almost all the sulfonium salts described in the literature are the low molecular weight, non-heat polymerizable type, it has been necessary, for the useful practice of this invention, to develop new formulations of sulfonium salts.

As said before, I have found that in order to be useful, sulfonium compounds in the binder must be low molecular weight and heat polymerizable, or, if not polymerizable, must be of high molecular weight, or must be salts of low molecular weight polymerizable anionic materials, or salts of high molecular weight polymerizable or non-polymerizable anionic compounds.

Thus, water solutions of monomeric or low molecular weight heat-polymerizable sulfonium compounds, or high molecular weight sulfonium compounds, or sulfonium salts of such polymeric or polymerizable compounds, after application to the surface to be coated, evaporation of the aqueous thinner or solvent, and followed by suitable heat treatment, are converted to water-insoluble, hydrophobic, non-ionic surface coating films as illustrated in the equation:

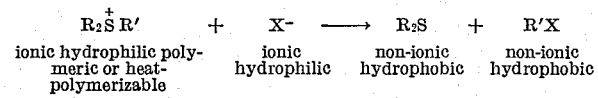
ionic hydrophilic polymeric or heat-polymerizable | ionic hydrophilic | non-ionic hydrophobic | non-ionic hydrophobic The exact nature of the groups R, R′, and X⁻ will vary from surface coating formulation to surface coating formulation. Thus, it is possible that the sulfonium group may be cyclic in structure, i.e.,

so that on heat curing the liberated sulfide still would be incorporated into the original structure:

Of course, the R and R′ groups must be such that they do not contain sufficient hydrophilic substituents other than sulfonium groups to prevent the products $R_2S$ and $R'X$ from being hydrophobic, even after heat treatment.

While the compositions as thus far described have included only a water-soluble binder containing sulfonium groups and an aqueous thinner or solvent, it is understood that other well-known surface coating ingredients which are inert or substantially inert under conditions of use can also be incorporated. The sulfonium binder can be used to bind pigments which are inert or substantially inert at the temperature of curing, and inert or substantially inert to the sulfides released in heating or curing, for example. Representative pigments include zinc sulfide, iron sulfide, titanium dioxide, carbon black and organic azo-dyes, for example. Inert or substantially inert extender pigments such as talc, mica, hydrated aluminum silicate, clays, diatomaceous silica, calcium carbonate and barium sulfate may be included in the final surface coating composition. The addition of pigments and extenders is not necessary, however, and the color of the final coating film can vary from formulation to formulation as hereinafter described depending only upon the particular sulfonium compound used as a binder.

Thus the surface of an object can be protected from water and colored at the same time by the use of the binder of the invention with or without pigments.

The basic invention remains the same, namely the incorporation of sulfonium groups into the binder so that the binder is water soluble, and so that on heat curing of the coating, the coating becomes enormously more hydrophobic because of the reaction of the incorporated sulfonium groups.

My experimental tests have disclosed that binders which polymerize further, either by condensation or addition polymerization, or binders that do not polymerize further may be employed to make heat curable, water-insoluble surface coatings.

Thus, the sulfonium group may or may not take part in polymer formation, either in the basic chain or by crosslinking. Combinations of such activities are also possible, such as, for example, the basic chain could form on heat curing by vinyl addition polymerization, but the material might then crosslink or polymerize further by a condensation mechanism at the sulfonium groups and/or at other functional groups.

Furthermore, liberated sulfide, obtained on heat curing of the polymer, might be incorporated into the polymeric structure, either by further reaction of other functional groups on R or by the liberation of RX instead of $SR_2$ as in the previous illustrative equation. This is shown in the following composite example wherein both processes are illustrated in detailed and generic equations. Detailed equation:

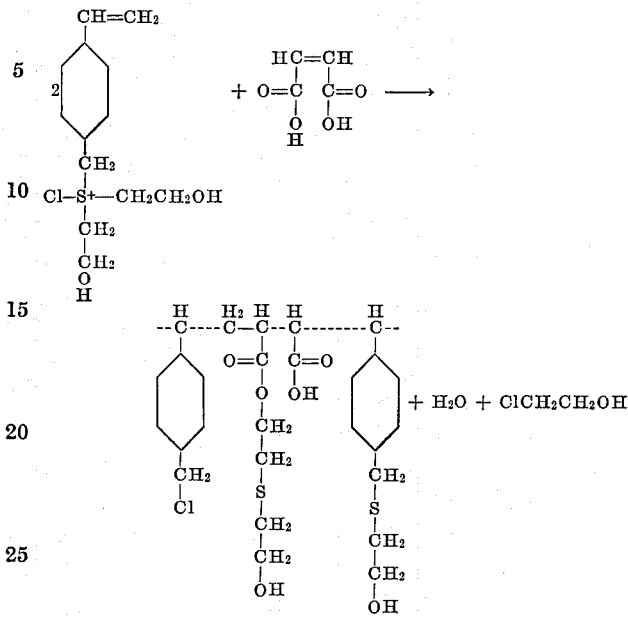

More abbreviated equation:

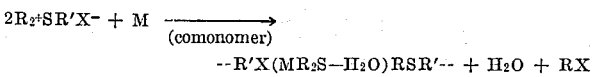

As indicated, heat curable, water-soluble, film-forming compositions of the present invention may comprise a binder containing a plurality of carboxyl groups in the form of their sulfonium salts. Such salts may be of polymerizable, olefinically unsaturated carboxylic acids, polycarboxylic acids and partial esters thereof. Such salts also may be of polymeric and copolymeric olefinically unsaturated carboxylic acids, polycarboxylic acids and partial esters thereof. They may be monomeric and polymerizable inner salts or polymeric inner salts, such as, for example, the salt formed by the polymerization of a solution obtained by mixing aqueous acrylic acid and a vinylbenzyl sulfonium carbonate.

Suitable carboxylic acids for forming sulfonium salts include, for example, monomers, polymers and copolymers of acrylic acid, methacrylic acid, ethylene dicarboxylic acids, benzene dicarboxylic acids, pyromellitic acid, trimellitic anhydride and the like.

Suitable sulfonium compounds include, for example, polyvinylbenzyldimethylsulfonium carbonate, ar-vinylbenzyldimethylsulfonium bicarbonate, ar-vinylbenzyldiethanolsulfonium carbonate, benzyl di(β-hydroxy ethyl) sulfonium bicarbonate, trimethylsulfonium hydroxide, p-xylylene bis (diethanol sulfonium bicarbonate) and the like.

In all cases of combinations of heat polymerizable, or polymerized carboxylic acids with the sulfonium compounds, the salts formed of course must be fairly water soluble in order to have the desired utility as binders. A simple test of mixing sulfonium carbonates or bicarbonates with the desired carboxylic acid will indicate if the sulfonium salt formed is sufficiently soluable in water to be useful. In general, polymeric sulfonium salts of polymeric carboxylic acids will not be sufficiently soluble. For example, combination of poly (ar-vinylbenzyl dimethyl sulfonium) carbonate with polymethacrylic acid leads to an insoluble precipitate. On the other hand, simple sulfonium compounds such as tris-(β-hydroxyethyl) sulfonium carbonate usually yield water soluble salts with polymerized carboxylic acids.

In a manner similar to that described in the foregoing section, sulfonium salts of organic sulfates, phosphates, sulfonates or phosphonates can be formed, and will yield water insoluble surface films after heat treatment, provided that the sulfonium salts are either heat polymerizable, or are polymeric even before heat treatment.

Experimental tests have also shown that the heat treatment which is given the surface coating to cure it, and thereby convert the soft, soluble, moist film to a usefully hard, water-insoluble, continuous film, can vary over fairly wide limits of time and temperature. In general, temperatures of from 45 to 65° C. or above are needed, and times of 5 minutes or more of heat treatment are needed. Much higher temperatures can be used up to and exceeding 200° C., and much longer duration of heat treatment also can be used. The temperatures used should be such as to avoid any undesirable charring or discoloration of the films, and should be sufficiently high to cause the film to cure to its maximum hardness and water resistance rapidly, in order to keep the cost of the heat treatment at a minimum. In general, I have found that temperatures of 125° C. to 200° C., for periods of about 20 to 30 minutes, give good results.

It is thus apparent, and is further illustrated in the following examples that a wide variety of polymerizable or polymeric systems are possible for making sulfonium modified water-soluble binders for surface coatings which heat cure to water insoluble coatings. Again, I explain the essential contribution of the sulfonium group as being its ability to react with a negative ion to form non-ionic, non-hydrophilic groups on heating and to convey water solubility to the system before heating, although the invention is not limited by this explanation or specific examples.

EXAMPLE I

Polyvinylbenzyldimethylsulfonium chloride was prepared by stirring 75 ml. of dimethyl sulfide, 125 ml. of water and 100 ml. of 97.5% chloromethyl styrene for 4 days at about 30° C. The resulting mixture was homogeneous, viscous, and light pink in color. Upon stirring the mixture into acetone a precipitate formed which was redissolved in water, reprecipitated in acetone, separated and air-dried for several hours. A 4% solution of the precipitate in water was prepared, placed on a porcelainized flat metal surface and allowed to dry overnight to give a smooth film. The surface and film were then heated over a hot plate until dimethyl sulfide evolution ceased. A stream of water was run over the film for 16 hours. The film did not loosen or soften.

EXAMPLE II

Several grams of ar-vinylbenzyl dimethylsulfonium bicarbonate solution (14% in water) dissolved more than ½ molar proportion of phthalic acid. A thin film of the mixture was formed in the bottom of a glass beaker and the beaker heated on a hot plate until the film had browned. The film was exceedingly hard and water-insoluble.

EXAMPLE III

To about 2 ml. of an aqueous solution of arvinylbenzyl diethanol sulfonium chloride was added 1 gram of technical maleic acid. The clear solution was evaporated to give a thin film on the bottom of a glass beaker. After heating the film was hard and water insoluble.

EXAMPLE IV

Example III was repeated using a polymer of the ar-vinylbenzyl diethanol sulfonium chloride with similar results.

EXAMPLE V

A solution of 43 ml. $(CH_3)_3S^+OH^-$ at 1.1 N plus a stoichiometric amount of polymethacrylic acid was prepared. This solution was amber in color, of medium viscosity and contained a slight excess of base. The pH was 11.5 to 12.

Films were made from the above solution by pouring a portion onto sheets of stainless steel, glass and aluminum and curing 3 hours in a 100° C. oven. The films were hard and shiny and firmly adhering and unswollen in water after 67 hours at room temperature.

EXAMPLE VI

To a 50 ml. vol. of 0.88 N benzyl di($\beta$-hydroxy ethyl sulfonium) bicarbonate was added a stoichiometric amount of a solution of polymethacrylic acid (4.32 grams) at 10.2 meq./g. This was shaken by hand to dissolve the solids. The pH was about 8.

Seven grams of this solution were diluted in 25 g. of $H_2O$ and films were made by pouring portions onto sheets of stainless steel, glass and aluminum. After 3 hours at 100° C., the films were hard and shiny when cooled to room temperature, and unswollen by water after soaking for 67 hours.

EXAMPLE VII 26 ml. of a solution of tri-methyl sulfonium hydroxide which was 0.25 N was mixed with 5 ml. of a solution of 1.33 N polyacrylic acid. These were stoichiometric amounts. A small amount (N 10 ml.) was poured on each, a sheet of stainless steel, a sheet of glass and an aluminum weighing dish.

Approximately 10 ml. of the 1.33 N polyacrylic acid was diluted to 25 ml. with $H_2O$ and also poured on a sheet of stainless steel, a sheet of glass and an aluminum weighing dish.

The straight polyacrylic acid films were all water soluble. The other films were very hard and flexible but were water swellable only.

EXAMPLE VIII

To 10 ml. of a .62 N (6.2 meq. or 3.1 millimoles) solution of p-xylylene bis (diethanol sulfonium bicarbonate) was added 10 ml. of a solution containing 0.396 g. (2.06 millimoles) tri-mellitic anhydride. A slightly turbid solution resulted. A film was poured on glass using ½ of the solution. It was air cured over the weekend.

The film was placed in 100° C. oven for approximately 2.5 hours. It became a hard water-insoluble film.

EXAMPLE IX

A polyacrylic acid solution was converted to the sulfonium salt by adding a water solution of tri ($\beta$-hydroxy ethyl) sulfonium bicarbonate. These were mixed in stoichiometric amounts based on the mono electrovalent sulfur (mole $$\overset{+}{S}(CH_2CH_2OH)_3$$

gram formula weight carboxyl group). The mixed solution was poured into a Pyrex Petrie dish and evaporated at room temperature over the weekend. The tacky film was then cured in the oven for 30 minutes at 185° C.

The film was approximately 9 mils thick and was very hard and shiny. This film was unchanged in hot water after 5 hours. Similar results were obtained when 2, 3, 4, and 5 moles of carboxyl group in the polyacrylic acid were employed per mole of $$\overset{+}{S}(CH_2CH_2OH)_3$$

and when hydroxide ion was substituted for the bicarbonate ion. In contrast, similar films prepared using stoichiometric amounts of ammonium hydroxide and the same polyacrylic acid were softened by hot water (steam bath) in ½ hour.

EXAMPLE X

The tri ($\beta$-hydroxy ethyl) sulfonium salt of polymethacrylic acid was made by mixing 0.9 ml. (1.73 meq./ml.) of a polymethacrylic acid with 6 ml. (0.26 meq./ml.) of the tri($\beta$-hydroxy ethyl) sulfonium bicarbonate. A film was cast of this mixture on Pyrex glass and cured for 30 minutes at 185° C., after evaporating to dryness overnight. A very hard film resulted which softened and blushed very slightly in water at room temperature. In 20 hours there was little change. Similar results were obtained when 2, 3, 4, and 5 moles of carboxyl group in polymethacrylic acid were employed per mole of tri(β-hydroxy ethyl) sulfonium bicarbonate.

EXAMPLE XI

A weight (.2096 g.) which contained 0.524 meq. of a terpolymer of acrylic acid (35%), butadiene (50%) and methyl methacrylate (15%) as a 47% solids solutions in n-butanol was mixed with 2 ml. of a water solution of 0.26 meq./ml.

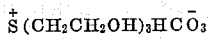

After sitting overnight the polymer was 95% dissolved (slightly turbid). This solution was poured on a Petri dish and placed on a steam bath in a hood draft. When it had dried to a film it was placed in a 185° C. oven for 30 minutes. This film was quite hydrophobic at room temperature in water.

Similar results were obtained when a terpolymer of 45 weight percent butadiene, 35 weight percent acrylic acid, and 20 weight percent methyl methacrylate and a terpolymer of 50 weight percent butadiene, 35 weight percent acrylic acid, and 15 weight percent styrene were employed with tri (β-hydroxy ethyl) sulfonium bicarbonate and hydroxide.

EXAMPLE XII

A 1.0 g. weight of a copolymer of 60% acrylic acid-40% butyl acrylate as 66.6% solids in isopropanol, containing 0.4 g. (5.5 meq.) acrylic acid groups, was added to 3.5 ml. of 0.26 n (.92 meq.) tri (β-hydroxyethyl) sulfonium bicarbonate. This was enough to solubilize the polyacrylic acid-butyl acrylate copolymer and is equivalent to 5 carboxyl groups per sulfonium group. This solution was then diluted to 11.5 ml. with deionized $H_2O$ and 1.5 ml. was used to cast a film on 2 square inches of a standard base-coated steel plate. This liquid film was evaporated overnight to a tacky film and then placed in a 185° C. oven for 30 minutes.

This produced a film that was hard (4–H pencil hardness) clear and shiny and stood up well in hot water. This film actually seemed to continue to cure in the hot water bath.

EXAMPLE XIII

A copolymer of pyromellitic dianhydride-diethylene glycol was prepared by refluxing equimolar amounts of pyromellitic dianhydride and diethylene glycol in dimethoxy ethane. The product was precipitated by adding ether and separated. A 5% solution in water contained 0.269 meq. of $H^+$ per milliliter. Films were cast on industrial base coated steel from mixtures of this solution plus 0.52 N tri (β-hydroxy ethyl) sulfonium bicarbonate solution in amounts such that the ratios of carboxylic groups to sulfonium groups were varied from 1/1 to 3/1 to 5/1. The films were evaporated to dryness and cured 30 minutes at 185° C. These films were 4–H pencil hardness, shiny and clear and adhered well even after 2½ hours in 90–95° C. water.

EXAMPLE XIV

Hydrophobic films were produced both from (A) the tri (β-hydroxy ethyl) sulfonium salt and from (B) the trimethyl sulfonium salt of poly (ar-vinyl benzene phosphonic acid). These films were made at mole ratios of 1 mole sulfonium compound per formula weight of phosphonate group. They were cured at a varying time-temperature program to prevent foaming. The films produced were hard (4–H pencil hardness), shiny and clear and remained hydrophobic even after 18 hours in 90° C. water. At this time the trimethyl sulfonium film had become dull and rough and scraped easily from the bar steel. The tri (β-hydroxy ethyl) sulfonium film had dulled somewhat and could be scraped from the base coat. The base coat used in this work was the industrial type, meeting the specifications M6J49 of the Ford Motor Company for commercial automotive primer surfacer, on bonderized steel. (Bonderite 100, from the Parker Rustproof Co.)

Control films were made both from the $Na^+$ and $NH_4^+$ salts of the poly (ar-vinyl benzene phosphonic acid). These were cured at 185° C. for 30 minutes and were soluble after 5 minutes in room temperature water.

The poly (ar-vinyl benzene phosphonic acid) was made by heating, at reflux, 8% crosslinked styrene divinyl benzene base phosphonic acid cation exchange resin with large excess of concentration of $HNO_3$ for 3 days, filtering, and vacuum distilling the residual $HNO_3$ from the low molecular weight phosphonate polymer. The polymer was insoluble in water, but the $NH_4^+$, $Na^+$ and above-described sulfonium salts were water soluble.

A theoretical equation, representing the reactions which occur, is given as follows:

Example (A)

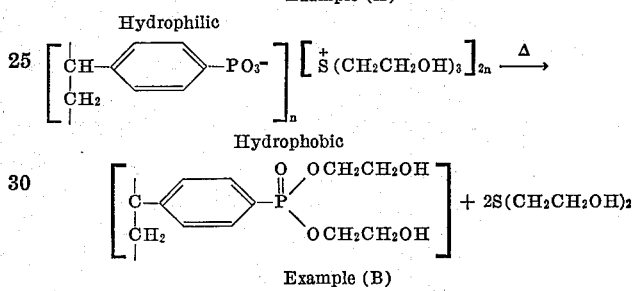

Example (B)

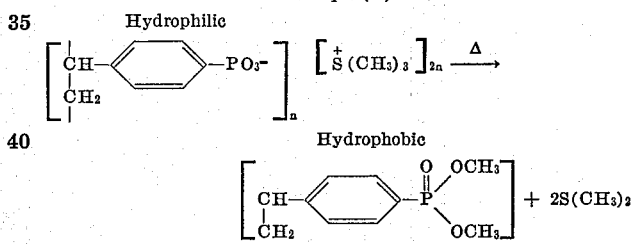

EXAMPLE XV

A hydrophobic film was produced from the heat-curing of a hydrophilic film of the tri (β-hydroxy ethyl) sulfonium salt of poly (ar-vinyl toluene sulfonic acid). This is illustrated by the following theoretical equation:

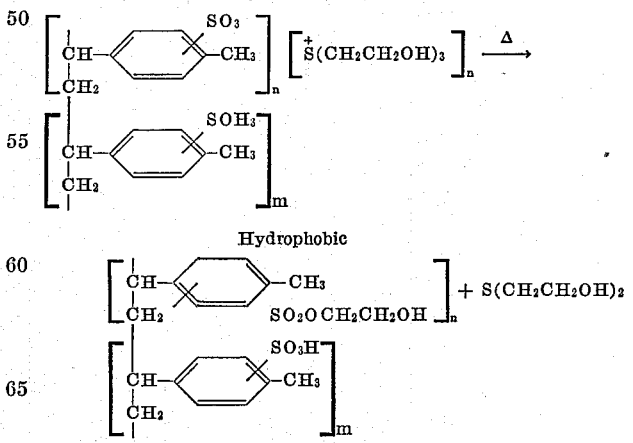

The mole ratio of poly (ar-vinyl toluene sulfonic acid) tri (β-hydroxy ethyl) sulfonium varied from 1/1 to 3/1. Cure conditions were 30 and 60 minutes at 185° C. The film softened somewhat after 20 minutes in room temperature water but remained insoluble at that time. By comparison, $NH_4^+$ and $Na^+$ salts of the poly (ar-vinyl toluene sulfonic acid) gave baked films which dissolved completely in 5 minutes.

The system of poly (ar-vinyl toulene sulfonic acid)/tri (β-hydroxy ethyl) sulfonium at 3 formula weights of sulfonic groups/1 mole and cured for 60 minutes at 185° C. produced the best film of this series. This was a smooth black film of 6–H pencil hardness.

Two control films were cast using the poly (ar-vinyl toluene sulfonic acid). One was cured for 30 minutes at 185° C. and one was cured for 60 minutes at 185° C. Both became insoluble films but were much more highly swollen after 20 minutes in room temperature water than the tri (β-hydroxy ethyl) sulfonium film.

Control films were also cast from the Na+ and NH4+ salts of the poly (ar-vinyl toluene sulfonic acid). These were both cured for 30 minutes at 185° C. and were soluble in room temperature water after 5 minutes. All of these films were cast on industrial base coat on bonderized steel.

I claim:

1. A surface coating composition comprising an aqueous solvent, a member of the group consisting of pigments and extender pigments which are inert or substantially inert under the conditions of use, and an ionic, hydrophilic binder selected from the group consisting of:
  (I) water soluble, heat polymerizable sulfonium salts containing:
    (A) as the cationic moiety thereof a member of the group consisting of heat polymerizable sulfonium ions, and
    (B) as the anionic member thereof a member of the group consisting of inorganic hydrophilic anions,
  (II) water soluble, heat polymerizable sulfonium salts containing:
    (A) as the cationic moiety thereof a member of the group consisting of non-polymerizable sulfonium ions and heat-polymerizable monomeric sulfonium ions, and
    (B) as the anionic moiety thereof a member of the group consisting of:
      (1) heat polymerizable carboxylate ions,
      (2) heat polymerizable sulfonate ions,
      (3) heat polymerizable phosphonate ions,
      (4) polymers of (1), (2) and (3),
      (5) polycarboxylic acid ions and partial esters thereof,
      (6) copolymers of (1), (2), (3), (4) and (5) with (a) each other and with (b) a member of the group consisting of olefinically unsaturated hydrocarbons and alkylene glycols; and
  (III) water soluble mixtures of (I) and (II);
said binder being dissolved in said solvent, said composition being adapted to be applied to a surface, said composition forming a soft hydrophilic film on said surface on drying, said soft film being convertible to a hard, water-insoluble surface-coating film on heating.

2. Composition of claim 1 wherein said heat polymerizable sulfonium ions are ar-vinylbenzyldi(loweralkyl)sulfonium ions wherein the loweralkyl groups contain from 1 to 12 carbon atoms.

3. Composition of claim 2 wherein the lower alkyl groups are methyl groups.

4. Composition of claim 1 wherein said heat polymerizable sulfonium ions are ar-vinylbenzyldi(hydroxyloweralkyl)sulfonium ions in which the loweralkyl groups contain from 2 to 5 carbon atoms.

5. Composition of claim 4 in which the sulfonium ions are ar-vinylbenzyldi(β-hydroxyethyl)sulfonium ions.

6. Composition of claim 1 wherein said nonpolymerizable sulfonium ions are tri-(hydroxyloweralkyl)sulfonium ions in which the lower alkyl groups contain from 2 to 5 carbon atoms, inclusive.

7. Composition of claim 6 wherein said sulfonium ions are tri-(β-hydroxyethyl)sulfonium ions.

8. Composition of claim 1 wherein said nonpolymerizable sulfonium ions are tri-(loweralkyl)sulfonium ions in which the alkyl groups contain from 1 to 12 carbon atoms, inclusive.

9. Composition of claim 8 wherein said sulfonium ions are trimethyl sulfonium ions.

10. A surface-coating composition comprising an aqueous solvent and an ionic, hydrophilic binder selected from the group consisting of water soluble, heat polymerizable sulfonium salts containing:
  (A) as the cationic moiety thereof a member of the group consisting of nonpolymerizable sulfonium ions and heat polymerizable monomeric sulfonium ions, and
  (B) as the anionic moiety thereof a member of the group consisting of:
    (1) heat polymerizable carboxylate ions,
    (2) heat polymerizable sulfonate ions,
    (3) heat polymerizable phosphonate ions,
    (4) polymers of (1), (2) and (3),
    (5) heat polymerizable polycarboxylate ions and partial esters thereof,
    (6) copolymers of (1), (2), (3), (4) and (5),
      (a) with each other and (b) with a member of the group consisting of olefinically unsaturated hydrocarbons and alkylene glycols;
said binder being dissolved in said solvent, said compositions being adapted to be applied to a surface, said composition forming a soft hydrophilic film on said surface on drying, said soft film being convertible to a hard, water-insoluble surface coating film on heating.

11. Composition of claim 10 wherein said polycarboxylate ions are benzene dicarboxylic acid ions.

12. The composition of claim 10 wherein said polycarboxylate ions are trimellitic acid ions.

13. The composition of claim 10 wherein said polycarboxylate ions are polyacrylic acid.

14. The composition of claim 10 wherein said polycarboxylate ions are maleate ions.

15. Composition of claim 10 wherein said polymers are poly(ar-vinylbenzene phosphonic acid).

16. Composition of claim 10 wherein said copolymers are ionic copolymers of pyromellitic acid and diethylene glycol.

17. Composition of claim 10 wherein said copolymers are ionic copolymers of acrylic acid and butyl acrylate.

18. Composition of claim 10 wherein said copolymers are ionic copolymers of acrylic acid, butadiene and methyl methacrylate.

19. Composition of claim 10 wherein said non polymerizable sulfonium ions are tri-(β-hydroxyethyl)-sulfonium ions.

20. A water-soluble surface coating binder comprising a member of the group consisting of water soluble, heat polymerizable sulfonium salts containing:
  (A) as the cationic moiety thereof a member of the group consisting of non-polymerizable sulfonium ions and heat polymerizable monomeric sulfonium ions, and
  (B) as the anionic moiety thereof a member of the group consisting of:
    (1) heat polymerizable carboxylate ions,
    (2) heat polymerizable sulfonate ions,
    (3) heat polymerizable phosphonate ions.
    (4) polymers of (1), (2) and (3),
    (5) polycarboxylic acid ions and partial esters thereof,
    (6) copolymers of (1), (2), (3), (4) and (5) with each other and with a member of the group consisting of olefinically unsaturated hydrocarbons and alkylene glycols;
said binder being adapted to be dissolved in an aqueous solvent, applied to a sulface, dried and heat-cured to form a hard, water-insoluble coating on said surface.

21. A water soluble, heat curable surface coating binder comprising a member of the group consisting of water soluble, heat polymerizable sulfonium salts containing:
(A) as the cationic moiety thereof a member of the group consisting of triloweralkyl-sulfonium ions, tri(hydroxyloweralkyl) sulfonium ions, aryl-bis-[di-(loweralkyl) sulfonium]ions and aryl-bis [di-(hydroxyloweralkyl)sulfonium] ions wherein the loweralkyl groups contain from 2 to 5 carbon atoms, inclusive, and
(B) as the anionic moiety thereof a member of the group consisting of:
  (1) heat polymerizable carboxylate ions,
  (2) heat polymerizable sulfonate ions,
  (3) heat polymerizable phosphonate ions,
  (4) polymers of (1), (2) and (3),
  (5) polycarboxylic acid ions and partial esters thereof,
  (6) copolymers of (1), (2), (3), (4) and (5) with each other and with a member of the group consisting of olefinically unsaturated hydrocarbons and alkylene glycols, said binder being adapted to be dissolved in an aqueous solvent to form a composition adapted to be applied to a surface, dried, and heat-cured to form a hard, water-insoluble surface coating.

22. Composition of claim 21 wherein said aryl-bias[di-(hydroxylloweralkyl)sulfonium] ions are p-xylylene bis-diethanol sulfonium) ions.

23. A hard, water-insoluble surface coating comprising the heat-cured bindor of claim 20.

24. The method of protecting a surface of an object, the method comprising coating said surface with a composition comprising an aqueous solvent and an ionic surface coating binder selected from the group consisting of:
(I) water soluble, heat polymerizable sulfonium salts containing:
  (A) as the cationic moiety thereof a member of the group consisting of heat polymerizable sulfonium ions, and
  (B) as the anionic member thereof a member of the group consisting of inorganic hydrophilic anions,
(II) water soluble, heat polymerizable sulfonium salts containing:
  (A) as the cationic moiety thereof a member of the group consisting of non-polymerizable sulfonium ions and heat polymerizable monomeric sulfonium ions, and
  (B) as the anionic moiety thereof a member of the group consisting of:
    (1) heat polymerizable carboxylate ions,
    (2) heat polymerizable sulfonate ions,
    (3) heat polymerizable phosphonate ions,
    (4) polymers of (1), (2) and (3),
    (5) polycarboxylic acid ions and partial esters thereof,
    (6) copolymers of (1), (2), (3), (4) and (5) with (a) each other and with (b) a member of the group consisting of olefinically unsaturated hydrocarbons and alkylene glycols, and
(III) water-soluble mixtures of (I) and (II);
evaporating the solvent therefrom and heating the resulting hydrophilic ionic soft film for a period of time and at a temperature sufficient to convert said film to a hard, water-insoluble, non-ionic surface coating film adhering to said surface.

25. The method of claim 24 wherein said ionic soft film is heated at a temperature of from about 45° C. to about 200° C.

26. The method of claim 24 wherein said ionic soft film is heated for a period of time from about 5 minutes to about 3 hours at a temperature of from about 65° C. to about 200° C.

27. The method of claim 24 wherein said ionic soft film is heated for from about 20 to 30 minutes at a temperature of about 125° C. to 200° C.

28. The method of claim 24 wherein the non-polymerizable sulfonium ions are tri-($\beta$-hydroxyethyl)-sulfonium ions and the ionic soft film is heated for about 30 minutes at about 185° C.

References Cited
UNITED STATES PATENTS

| | | | |
|---|---|---|---|
| 3,022,199 | 2/1962 | Lloyd et al. | 260—79.7 |
| 3,060,156 | 10/1962 | Rassweiler et al. | 260—79.7 |
| 3,078,259 | 2/1963 | Hatch et al. | 260—79.7 |
| 3,130,117 | 4/1964 | Humiston et al. | 260—79.7 |
| 3,216,979 | 11/1965 | Sexsmith et al. | 260—29.60 |

MURRAY TILLMAN, Primary Examiner

WILBERT T. BRIGGS, SR., Assistant Examiner

U.S. Cl. X.R.

117—132, 161; 260—29.7, 41, 75, 78.5, 79.5, 79.7, 80.7, 86.1